United States Patent [19]

Dong

[11] Patent Number: 5,675,973

[45] Date of Patent: Oct. 14, 1997

[54] THERMOELECTRIC COOLING DEVICE FOR PURIFIED WATER TANK

[75] Inventor: Joung Whi Dong, Seoul, Rep. of Korea

[73] Assignee: Chung Ho Nais Incorporation, Seoul, Rep. of Korea

[21] Appl. No.: 585,521

[22] Filed: Jan. 16, 1996

[51] Int. Cl.$^6$ ............................................. F25B 21/02
[52] U.S. Cl. ......................... 62/3.6; 210/175; 210/257.1
[58] Field of Search .................................... 210/149, 175, 210/181, 257.1, 257.2, 541, 634; 62/3.6, 3.64, 3.2; 222/146.6; 2/634

[56] References Cited

U.S. PATENT DOCUMENTS

| | | | |
|---|---|---|---|
| 3,008,299 | 11/1961 | Sheckler | 62/3.64 |
| 4,014,792 | 3/1977 | Gossett et al. | 210/257.2 |
| 4,752,389 | 6/1988 | Burrows | 210/257.2 |
| 4,880,535 | 11/1989 | Burrows | 210/257.2 |
| 5,043,066 | 8/1991 | Miller et al. | 210/257.2 |

FOREIGN PATENT DOCUMENTS 4108441  9/1992  Germany ........................ 210/181

*Primary Examiner*—Joseph W. Drodge
*Attorney, Agent, or Firm*—Harrison & Egbert

[57] ABSTRACT

A water cooling device for water purifiers is disclosed. The device rapidly cools the purified water by precooling and main-cooling thermoelements prior to delivering the purified water for users to drink, thereby saving electrical energy and providing commercially-viable water purifiers. The water cooling device has an auxiliary purified water pipe branched from the main purified water pipe, the main pipe leading from the water purifying system to the purified water tank. The auxiliary purified water pipe leads to the water cooling tank provided with a first thermoelement. A second thermoelement is mounted to the auxiliary purified water pipe and adapted for precooling the purified water before the purified water is introduced into the cooling tank.

3 Claims, 2 Drawing Sheets

THERMOELECTRIC COOLING DEVICE FOR PURIFIED WATER TANK

BACKGROUND OF THE INVENTION

1. Field of the Invention

The present invention relates in general to water purifiers capable of preparing cold purified water and, more particularly, to a structural improvement in a water cooling device for such water purifiers for rapidly cooling the purified water and thereby saving electrical energy while cooling the water. The above improvement not only precools the purified water by a precooling thermoelement prior to introduction of the purified water to a water cooling tank with a main-cooling thermoelement, it also promotes active circulation of the purified water between the hot and cold water layers in the water cooling tank.

2. Description of the Prior Art

The applicant of this invention proposed a cooling device for water purifiers which cools purified water by a thermoelement, a kind of semiconductor unit, mounted to the cooling tank of a water purifier, thereby preparing cold purified water. As well known to those skilled in the art, the typical thermoelement comprises two junctions, that is a cold junction and a hot junction. In the above cooling device, the cold junction of the thermoelement is mounted to the cooling tank and absorbs heat from the water in the tank, while the hot junction receives heat from the cold junction and dissipates heat to the surroundings, thereby cooling the water. Additionally, N- and P-type semiconductors are interposed between the two junctions to transmit the heat from the cold junction to the hot junction. The above thermoelement dissipates heat exclusively when a current flows in the hot junction.

However, the typical cooling devices for water purifiers are problematic in that both the hot and cold waters circulate at a low velocity when preparing the cold purified water as the thermoelement is mounted to the bottom of the cooling tank as disclosed in this applicant's U.S. patent Ser. No. 08/350,210 filed on Dec. 6, 1994. Due to the low velocity circulation of the hot and cold waters, the above device wastes much electrical energy while preparing the cold purified water, thereby being not commercially-viable. Additionally, the water purifier with the above cooling device fails to delivery the cold purified water for users to drink in a short time.

Another problem of the above cooling device is caused by the fact that there is a remarkable temperature difference between the normal temperature water and the object cold purified water to be delivered. With the above temperature difference, the device has to waste much time to cool the purified water to a desired temperature.

SUMMARY OF THE INVENTION

It is, therefore, an object of the present invention to provide a water cooling device for water purifiers in which the above problems can be overcome and which rapidly cools the purified water by precooling and main-cooling thermoelements prior to delivering the cold purified water for users to drink, thereby saving electrical energy and providing commercially-viable water purifiers.

In order to accomplish the above object, the present invention provides a water cooling device for water purifiers comprising a purified water tank connected to a water purifying system through a main purified water pipe and adapted for containing purified water coming out of the water purifying system, a water cooling tank with a first thermoelement for selectively cooling the purified water prior to delivering the purified water for people to drink, and a coolant pipe coupled to a hot junction of the first thermoelement to absorb heat from the hot junction, further comprising: an auxiliary purified water pipe branched from the main purified water pipe and leading to the water cooling tank; and a second thermoelement mounted to the auxiliary purified water pipe and adapted for precooling the purified water flowing in the auxiliary purified water pipe before the purified water is introduced into the cooling tank.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
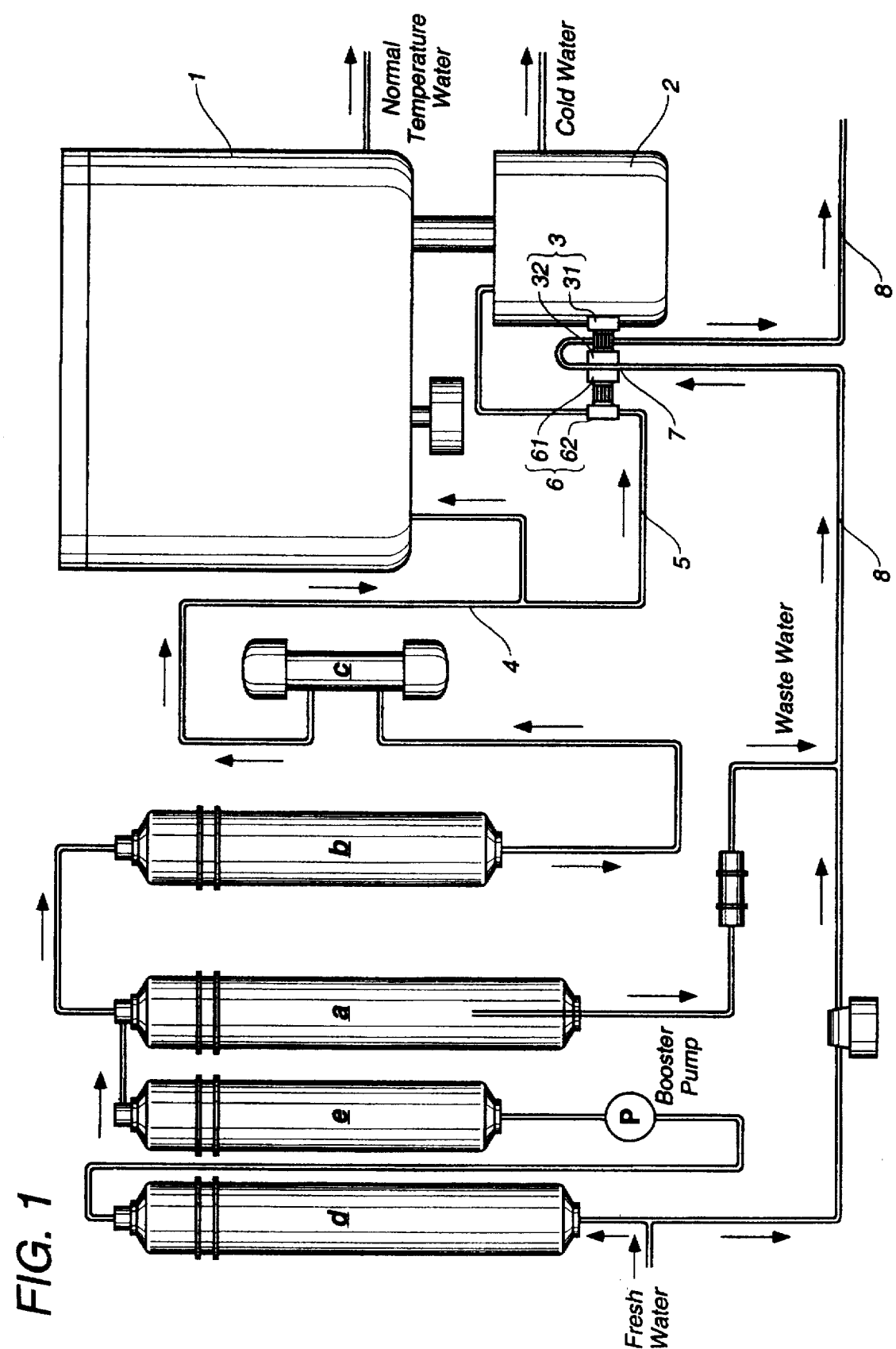
FIG. 1 is a view showing the construction of a water purifier provided with a water cooling device of the present invention.

FIG. 1 is a view showing the construction of a water purifier provided with a water cooling device of the present invention. As shown in the drawing, the fresh water is treated by a conventional water purifying system to become purified water. That is the fresh water is primarily filtered by a settling filter (d) which filters off impurities. The fresh water coming out of the settling filter (d) in turn flows to a booster pump (P) wherein the water pressure is increased. The high pressure water coming out of the pump (P) in turn passes through a first carbon filter (e) wherein the water is secondarily filtered. The secondarily filtered water of the carbon filter (e) in turn flows to a membrane (a), thereby being thirdly filtered and becoming clear water. This clear water coming out of the membrane (a) in turn flows to a second carbon filter (b). In the second carbon filter (b), the water is fourthly filtered and in turn flows to an ultraviolet (U/V) filter (c) wherein the water will be fifthly and finally filtered. The finally filtered water or completely purified water coming out of the U/V filter (c) flows into a purified water tank 1 through a purified water pipe 4.

The purified water of the tank 1 may be directly delivered for users to drink as normal temperature purified water. Alternatively, the purified water of the tank 1 may be heated by a heater prior to being delivered as hot purified water. As a further alternative, the above purified water in the tank 1 may flow into a water cooling tank 2 with a first thermoelement 3 prior to being delivered as cold purified water. The above thermoelement 3 is mounted to the side wall of the cooling tank 2. The hot junction of the above thermoelement 3 is coupled to a coolant circulation pipe through which coolant such as purification waste water or fresh water flows. The coolant flowing in the pipe receives the heat dissipated from the hot junction of the thermoelement 3, thereby promoting the heat dissipating effect of the hot junction. In the above thermoelement 3, the cold junction 31 is mounted to the side wall of the cooling tank 2 to be cooled, while the hot junction 32 is coupled to the pipe and dissipates heat.

As described above, the present invention is characterized in that the thermoelement 3 is mounted to the side wall of the cooling tank 3. In the present invention, it is more preferable to mount the thermoelement 3 to a portion of the tank's side wall corresponding to the interface between the hot water layer and the cold water layer in the tank 2. The operational effect of the cooling device is further improved when mounting the thermoelement 3 to a portion just below the interface between the hot and cold waters layers. In this case, the water current in the tank 2 circulates most actively between the hot and cold water layers and thereby further improves the operational effect of the device. Of course, it is obvious that the thermoelement 3 has to be brought into close contact with the side wall of the tank 2 regardless of the thermoelement's position relative to the tank 2.

The purified water in the cooling tank 2 circulates actively between the hot and cold water layers in the tank 2 due to the positional change of the thermoelement 3 from the tank's bottom to the tank's side wall in accordance with the invention. Therefore, the purified water in the tank 2 can be rapidly cooled while saving electrical energy. The present invention thus provides commercially-viable water purifiers. Meanwhile, an auxiliary purified water pipe 5 is branched from the main purified water pipe 4 which directly leads to the purified water tank 1. The auxiliary pipe 5 directly leads to the cooling tank 2. The above pipe 5 is provided with a second thermoelement 6. In the second thermoelement 6, the cold junction is brought into close contact with the pipe 5.

Figure 2:
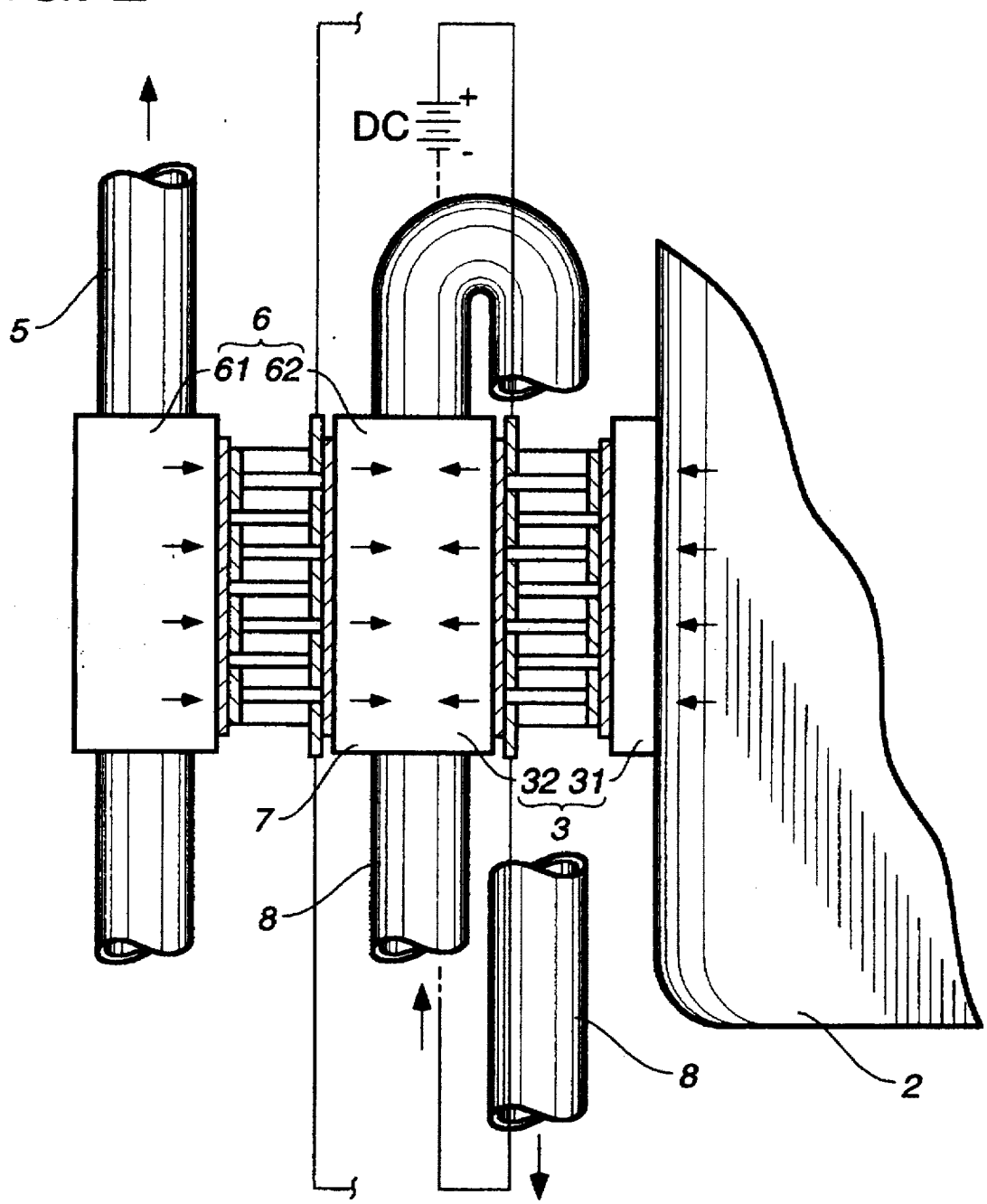
FIG. 2 is a view showing the detailed construction of the above water cooling device including a main cooling unit and a precooling unit.

FIG. 2 shows the first and second thermoelements 3 and 6 which are arranged side by side with each other and integrated into a set. That is, the first and second thermoelements 3 and 6 are arranged on both sides of a connection member 7. The hot junctions of the above thermoelements 3 and 6 are coupled to the both sides of the connection member 7. When the thermoelements 3 and 6 are integrated into a set as described above, it is easier to assemble the thermoelements 3 and 6 in the water purifier. In the cooling device of this invention, the first thermoelement 3 mounted to the side wall of the cooling tank 2 acts as a main cooling unit, while the second thermoelement 6 mounted to the auxiliary pipe 5 acts as a precooling unit. It is more preferable to arrange the above precooling unit 6 near the water inlet port of the cooling tank 2. In this case, the cooling device effectively prevents the temperature of the precooled water from rising, thereby cooling the purified water more rapidly and saving electrical energy more effectively. The above connection member 7 is fitted over a coolant circulation pipe 8.

When it is required to deliver the cold purified water for users to drink just after the water has been purified, the auxiliary pipe 5 is opened allowing the purified water coming out of the U/V filter (c) to directly flow into the cooling tank 2. In addition, the hot junctions 32 and 62 of the first and second thermoelements 3 and 6 are applied with a current, while the coolant circulation pipe 8 is opened to circulate the coolant.

The second thermoelement 6 receives heat from the purified water of the pipe 5 through its cold junction 62 and dissipates the heat to the connection member 7 through its hot junction 61, thereby preliminarily cooling the purified water before the purified water is introduced into the tank 2. As the purified water is precooled by the second thermoelement 6 before the water is introduced into the cooling tank 2, it is possible to reduce the time for cooling the water in the cooling tank 2 to a desired temperature. Therefore, the cooling device of this invention remarkably saves electrical energy while cooling the purified water.

In the cooling tank 2, the water current actively circulates between the hot water layer and the cold water layer as the first thermoelement 3 is mounted to a specified portion of the tank's side wall corresponding to the interface between the hot and cold water layers. The above active water circulation in the tank 2 reduces the time for cooling the purified water in the tank 2, thereby saving electrical energy.

As described above, the present invention provides an improved cooling device for water purifiers. In the cooling device of this invention, the purified water is preliminarily cooled by a precooling unit before the water is introduced into a cooling tank. The precooled purified water in the cooling tank in turn is secondarily cooled to a desired low temperature by a main cooling unit. With the above precooling unit, the cooling device of this invention rapidly cools the purified water in a short time prior to delivering the water for users to drink. Even when the precooling unit doesn't operate, the instant cooling device also rapidly cools the normal temperature purified water in comparison with the prior art cooling device. Therefore, the cooling device of this invention remarkably saves electrical energy while cooling the purified water.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A water cooling device for a water purifier having a purified water tank connected to the water purifier through a main purified water pipe, the purified water tank containing purified water coming out of the water purifier, the water cooling device comprising:

a water cooling tank with a first thermoelement means for selectively cooling the purified water prior to delivering the purified water for people to drink;

a coolant pipe means coupled to a hot junction of said first thermoelement means, said coolant pipe means for absorbing heat from said hot junction;

an auxiliary purified water pipe connectable to the main purified water pipe and connected to said water cooling tank; and a second thermoelement means mounted onto said auxiliary purified water pipe, said second thermoelement means for precooling the purified water flowing in said auxiliary purified water pipe before the purified water is introduced into said cooling tank, said hot junction of said first thermoelement means and a hot junction of said second thermoelement means being mounted to a connection member so as to integrate said first and second thermoelement means and said connection member into a set, said connection member being coupled to said coolant pipe.

2. The water cooling device according to claim 1, wherein said hot junction of the said second thermoelement means is operable for dissipating heat to a coolant flowing in said coolant pipe.

3. The water cooling device according to claim 1, wherein said first and second thermoelements are mounted to a side wall of said water cooling tank.

* * * * *